US009874919B2

(12) United States Patent
Jau et al.

(10) Patent No.: US 9,874,919 B2
(45) Date of Patent: Jan. 23, 2018

(54) SOFT SWITCHING CONTROL AFTER POWER INTERRUPTION

(71) Applicant: Quanta Computer Inc., Taoyuan (TW)

(72) Inventors: Maw-Zan Jau, Taoyuan (TW);
Shu-Chen Ni, Taoyuan (TW);
Chin-Hsiang Chan, Taoyuan (TW);
Yi-Sheng Chen, Taoyuan (TW);
Chih-Chang Tsai, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 112 days.

(21) Appl. No.: 14/691,160

(22) Filed: Apr. 20, 2015

(65) Prior Publication Data
US 2015/0331468 A1 Nov. 19, 2015

(30) Foreign Application Priority Data
May 14, 2014 (TW) .............................. 103116911 A

(51) Int. Cl.
G06F 1/30 (2006.01)
G06F 1/32 (2006.01)
H02J 9/06 (2006.01)

(52) U.S. Cl.
CPC .............. G06F 1/30 (2013.01); G06F 1/3287 (2013.01); H02J 9/06 (2013.01)

(58) Field of Classification Search
CPC .............. G06F 1/30; G06F 1/3287; H02J 9/06
See application file for complete search history.

(56) References Cited

U.S. PATENT DOCUMENTS 6,630,750 B2 * 10/2003 McAndrews ............. H02J 1/10
307/64
7,683,575 B2 * 3/2010 Berdichevsky ..... H01M 10/425
320/122

(Continued)

FOREIGN PATENT DOCUMENTS

CN 1758502 A 4/2006
CN 102902339 A 1/2013

(Continued)

OTHER PUBLICATIONS

Office Action dated Jul. 23, 2015 in Taiwanese Application No. 103116911.

(Continued)

*Primary Examiner* — Fahmida Rahman
(74) *Attorney, Agent, or Firm* — Nixon Peabody LLP; Eduardo J. Quinones; Zhou Lu

(57) ABSTRACT

In some implementations, power provided to a computing system, such as a rack system, may be interrupted. This interruption is detected, and in response, power from a battery backup system is directed to the computing system to replace the interrupted power source, which in some implementations may be a main AC power grid source. A signal is received indicating that a backup power source, for example a backup generator system, is online and prepared to deliver power to the computing system. For an initial period of time, this backup power source is prevented from providing power to the computing system. For example, the backup generator system may be providing power to a power supply unit of the computing system, but the power is not allowed to flow to the computing system. After the initial period of time passes, the power provided to the computing system by the battery backup unit is reduced at a particular rate of change while the power from the backup (Continued)

generator system is allowed to flow to the computing system through the power supply unit.

20 Claims, 8 Drawing Sheets

(56) References Cited

U.S. PATENT DOCUMENTS

| | | | | |
|---|---|---|---|---|
| 8,067,857 | B2* | 11/2011 | Humphrey | G06F 1/263 307/82 |
| 9,037,879 | B2* | 5/2015 | Jau | G06F 1/305 713/300 |
| 9,225,202 | B1* | 12/2015 | Kim | H02J 9/061 |
| 2007/0278860 | A1* | 12/2007 | Krieger | H02J 9/061 307/64 |
| 2012/0013304 | A1* | 1/2012 | Murase | B60L 11/1864 320/116 |
| 2013/0031381 | A1 | 1/2013 | Jau et al. | |
| 2013/0227310 | A1* | 8/2013 | Jau | G06F 1/30 713/300 |
| 2013/0234508 | A1* | 9/2013 | Eisele | H02J 7/0013 307/9.1 |
| 2015/0069842 | A1* | 3/2015 | Niu | H02J 9/061 307/64 |

FOREIGN PATENT DOCUMENTS

| | | |
|---|---|---|
| CN | 103294152 A | 9/2013 |
| CN | 103647339 A | 3/2014 |
| TW | 201305798 A1 | 2/2013 |

OTHER PUBLICATIONS

Summary of Office Action dated Jul. 23, 2015 in Taiwanese Application No. 103116911.
Chinese Office Action for Application No. 201410247550.3 dated Feb. 20, 2017, w/ First Office Action Summary.

* cited by examiner

SOFT SWITCHING CONTROL AFTER POWER INTERRUPTION

CROSS-REFERENCE TO RELATED APPLICATIONS

This application claims the benefit of Taiwan Patent Application No. 103116911, which was filed May 14, 2014. The aforementioned application is herein incorporated by reference in its entirety.

TECHNICAL FIELD

The disclosure generally relates to server power management.

BACKGROUND

Computing devices are subject to fluctuations in power supplied to the computing devices. These fluctuations may cause damage to components of the computing device, as well as affecting the ability of backup power systems to remain operational. For example, a surge in current resulting from activation of a backup power system may overwhelm components of the computing device and result in failure of the backup power system. Without a reliable and stable source of power, computing devices cannot operate at peak uptime and efficiency.

SUMMARY

In some implementations, power provided to a computing system, such as a rack system, may be interrupted. This interruption is detected, and in response, power from a battery backup system is directed to the computing system to replace the interrupted power source, which in some implementations may be a main AC power grid source. A signal is received indicating that a backup power source, for example a backup generator system, is online and prepared to deliver power to the computing system. For an initial period of time, this backup power source is prevented from providing power to the computing system. For example, the backup generator system may be providing power to a power supply unit of the computing system, but the power is not allowed to flow to the computing system. After the initial period of time passes, the power provided to the computing system by the battery backup unit is reduced at a particular rate of change while the power from the backup generator system is allowed to flow to the computing system through the power supply unit.

Particular implementations provide at least the following advantages: First, power supply units and backup generator power systems are protected from the effects of inrush current. Second, providing this protection does not require complex circuitry designs and expensive and time-consuming modifications to existing systems.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
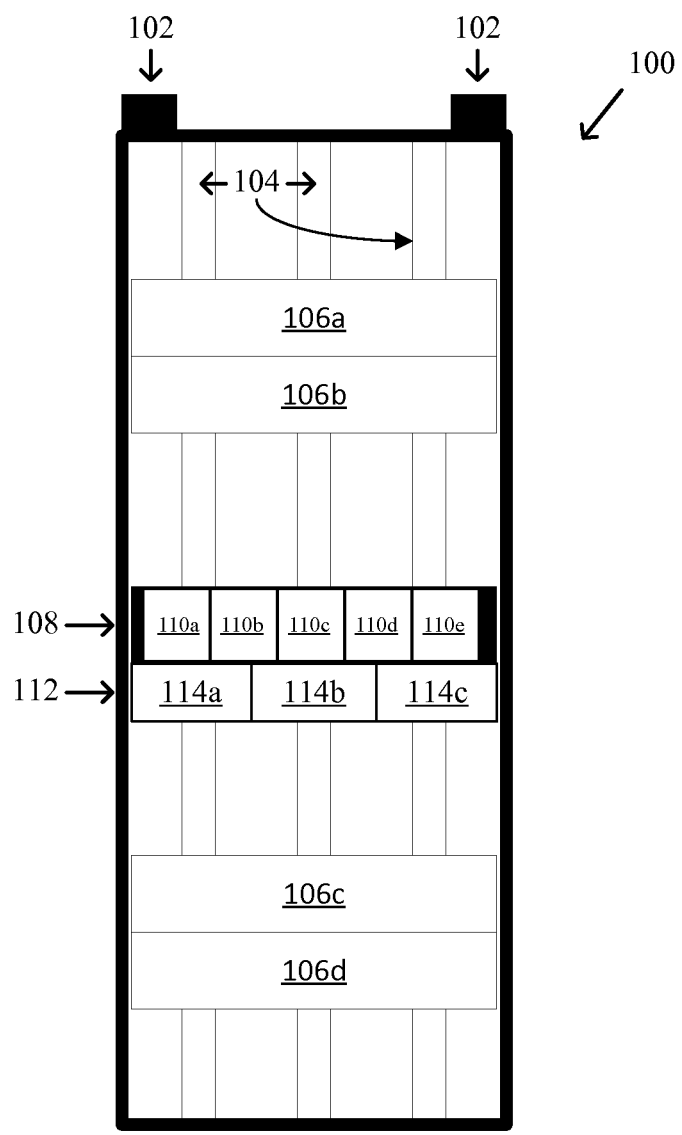
FIG. 1 illustrates an example rack system, according to some embodiments.

Various embodiments of the present technology are discussed in detail below. While specific implementations are discussed, it should be understood that this is done for illustration purposes only. A person skilled in the relevant art will recognize that other components and configurations may be used without departing from the spirit and scope of the present technology.

Data centers may house hundreds to thousands of rack server systems, each rack server system ("rack systems") having numerous computing systems (e.g., "servers") connected to it. These servers configured in the rack systems provide the backbone for the Internet. The servers execute applications integral to modern computing life, such as web servers, mail servers, database servers, etc.

Because of their essential nature, significant resources are devoted to assuring that the rack systems, and by extension the servers connected within the rack systems, have a reliable, continuous power supply in the data centers. The large amount of rack systems in data centers require a tremendous amount of electricity and an interruption in power, even for a brief period of time, can result in loss of data, downtime for essential Internet resources, and even damage to the components comprising the systems in the data center.

In order to provide continuous, stable power to the systems, data centers often have a backup generator power system. These generators initiate operation in the event of a loss of power in the main AC lines from power utilities and are designed to provide power for the rack systems in the data center to operate during the main power outage.

Some backup generator power systems have the capacity to provide all the power required by the entire data center for an extended period of time, while other backup generator power systems are more limited in their performance capacity and may offer a compromise of more power for a shorter duration (i.e., more rack systems can operate fully for a shorter period of time) or less power for a longer duration (i.e., fewer rack systems can operate fully for a longer period of time).

While backup generator power systems cannot operate indefinitely at a similar level of performance provided by the main AC power from a public utility grid, they at a minimum allow for the connected systems to fail gracefully; that is, granting time to shut down some or all systems safely before the generator reaches its limits with regard to amount of power available and duration of operation.

In the period after a loss of main grid power and the backup generator power system coming online, battery backup systems are utilized to bridge the gap in power supply. A battery backup system in a rack system may comprise one or more battery backup units, for example connected in parallel or in series. There may be multiple battery backup systems in a rack system.

The latency between a loss of main power to a data center and restoration of power from a backup generator power system can be unpredictable, but can fall in the range of 60 seconds in some cases, although conditions may result in that time being more or less in each occurrence. Battery backup systems for rack systems operate similarly to a battery in a laptop computer; that is, redundant power is continuously available from a charged battery attached to a rack system, and if a main power source fails, internal circuitry automatically switches over to the redundant power from the battery, thereby avoiding any loss of power to the system.

Once the backup generator power system comes online, it begins delivering AC power to the power supply units of the rack systems, as did the main utility AC power line prior to the power outage. Rack systems may have multiple power supply units connected, for example to a bus bar system as described herein for delivering DC power through the rack system. Traditionally, once power from the backup generator power system begins flowing to the power supply units of the rack system, the battery backup system stops operating; i.e., internal circuitry in the rack system prevents current from the battery backup system from flowing to the rack system.

However, when the backup generator power system turns on, there is often a surge current, or "inrush current," that can overwhelm components of a power supply. Inrush current may be described as a large power spike, usually short in duration, which can occur when power is initially provided to a power supply. For example, a power supply unit may have exhausted its capacitors after an initial interruption in the input power, because the charge stored in the capacitors allows the rack system to maintain operation for the brief interval before the battery backup system delivers power to the rack system.

Once power is restored to the power supply units, a large amount of current is drawn in order to recharge the capacitors, causing a surge into the power supply. This surge of current can appear to be a short circuit, which can cause the backup generator power system to fail, for example because of exceeding current protection parameters. Additionally, backup generator power systems may take time to operate consistently; for example, a backup generator power system may start operation, fail briefly, then resume operation. These brief failures may occur several times as the backup generator power system begins operation.

Current approaches to handling inrush current coinciding with operation of a backup generator power system include randomly turning on individual power supply units once current begins flowing from a backup generator power system, thereby reducing the amount of current initially drawn by the system. However, these approaches require complex circuitry designs and modifications to existing power supplies in order to protect existing systems.

Thus, there is a need to provide an effective approach to protecting power supply units and backup generator power systems from the effects of inrush current that does not require complex circuitry designs and expensive and time-consuming modifications to existing systems.

FIG. 1 illustrates an example rack system 100, according to some embodiments. Rack system 100 is connected to an input power source, for example an AC power line from the main power grid emanating from a power company or utility. In some implementations, an input power source (e.g., AC power from the power grid) connects to rack system 100 through some number of AC input plugs 102. Power flows from AC input plugs 102 to one or more power supply units 110a-110e through cabling (not shown). In some implementations, the input AC power flows to a power distribution unit (not shown) that controls the distribution of power to power supply units 110a-110e. Power supply units 110a-110e may be arranged on a power supply shelf 108.

A rack system may have one or more microcontrollers or modules (e.g., a rack management controller or "RMC") operable to control aspects of the rack system operation, including for example the power distribution unit, the power supply shelf, the individual power supply units, the battery backup systems, etc. For example, a RMC may control the power input to the rack system, such as whether power is sourced from a main AC power source, a battery backup unit, etc. In addition, each server configured within the rack system may utilize a service controller (e.g., a baseband management controller) operable to control aspects of the server, in some implementations including various components coupled to the server, such as a power supply unit, battery backup unit, etc. A baseboard management controller (BMC) is an independent and embedded microcontroller that, in some embodiments, is responsible for the management and monitoring of the main CPU, firmware and operating system of a server.

In some implementations, there are one or more bus bars 104 running the full height of rack system 100, although various configurations of bus bars are envisioned. Power supply units 110a-110e receive 12 v of input AC power and converts it into 12 v of DC output power, which is delivered via bus bars 104 to components of rack system 100 connected to bus bars 104, which in some implementations include one or more computer servers 106a-106d and one or more battery backup units 114a-114c. Battery backup units 114a-114c may be arranged on a battery backup shelf 112. Example computer servers 106a-106d may be a portion of many servers configured in a multiple rack systems at a data center.

While reference is made herein to a "rack system," "power supply unit," and a "battery backup unit," it should be understood that use of a singular unit in the examples herein does not preclude use of multiple units in various implementations. As described above, a power supply system of a rack system 100 may comprise numerous components known in the art; for example, one or more power supply shelves 108, one or more power distribution units (not shown), one or more power supply units 110a-110e, one or more battery backup shelves 112, one or more battery backup units 114a-114c, and other components not shown in FIG. 1, yet known in the art. Methods of connecting the various components envisioned by FIG. 1 and various implementations are known in the art. For example, electrical components may be connected in parallel or in series.

In some implementations, a RMC may operate to control various operational aspects of the components illustrated in FIG. 1, while in other implementations, one or more components illustrated in FIG. 1 may comprise individual microcontrollers and/or modules that operate to control various aspects of the component's operation, as described more fully herein.

Figure 2:
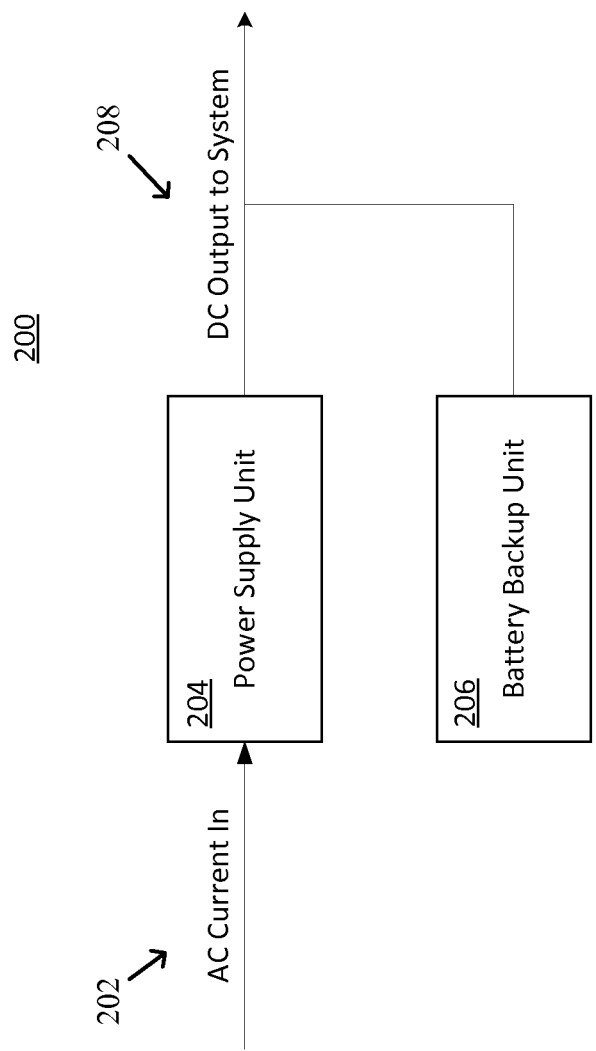
FIG. 2 illustrates input and output power from a power supply unit and a battery backup unit, according to some embodiments.

FIG. 2 illustrates input and output power from a power supply unit and a battery backup unit 200, according to some embodiments. For example, AC Current flows in 202 from the AC power grid; e.g., a power utility, and flows into a rack system where in some implementations it arrives at a Power Supply Unit 204. There may be one or more Power Supply Units 204 configured in a rack system. Power Supply Unit 204 converts the AC Current 202 into DC power and then outputs the DC power 208 to the rack system and from there to components coupled to the rack system such as servers, through approaches described herein such as bus bars. Additionally, power supply unit may provide trickle power to charge battery backup unit 206. In some implementations, power supply unit 204 also performs actions on the power, such as "conditioning" it prior to delivering the power to a coupled system. Concurrently, Battery Backup Unit 206 outputs a redundant DC power to the rack system, which in the case of an interruption to the AC current becomes the main power supply for the rack system. As described herein, one or both of power supply unit 204 and battery backup unit 206 may comprise microcontrollers or modules that control aspects of their operation, for example determining the amount of power to output, determining a period of time during which actions may be taken, etc. Additionally, the rack system may comprise components operable to control aspects of power supply unit 204 and battery backup unit 206.

Figure 3:
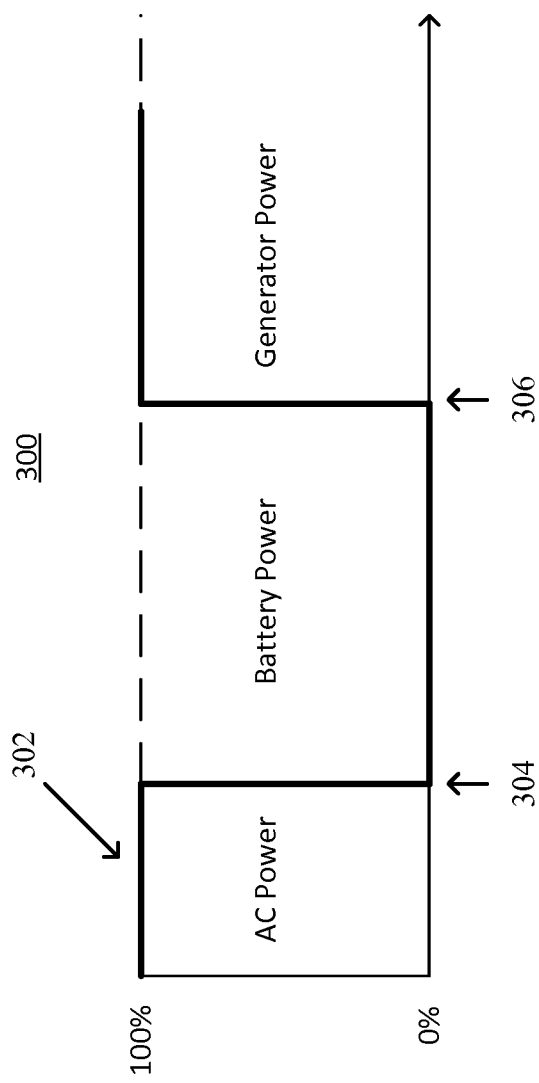
FIG. 3 illustrates input power to a power supply unit, according to some embodiments.

FIG. 3 illustrates input power to a power supply unit 300, according to some embodiments. In this example, while AC power flows uninterrupted from the AC power grid 302, 100% of the rack system power needs are provided by the AC power, for example routed through one or more power supply units. At a point where the AC power is interrupted 304, battery power (e.g., one or more battery backup units) takes over providing 100% of the power needs for the rack system to which it is coupled. In some implementations, AC power may only be partially interrupted; i.e., unable to provide 100% of the rack system power needs. One or more battery backup units may then provide supplemental power to meet the need created by the AC power flowing at less than 100% efficiency.

At some point after the interruption in AC power 304, a backup generator power system activates 306 and begins supplying power, for example to the power supply units of one or more rack systems. For example, the battery backup units provided power during the downtime between the AC power going out and the backup generator power system coming online. In some implementations, the battery backup unit determines that the backup generator power system has come online and reduces its power output to the power supply unit.

Figure 4:
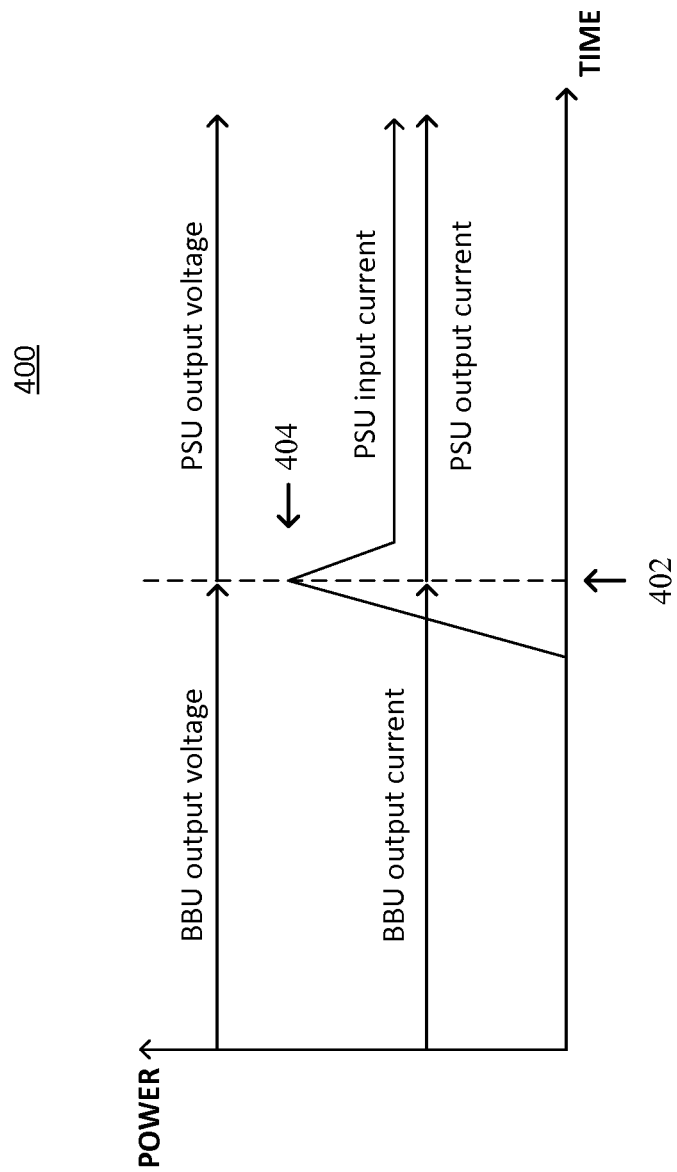
FIG. 4 illustrates output power from a power supply unit and a battery backup unit, according to some embodiments.

FIG. 4 illustrates output power from a power supply unit and a battery backup unit 400, according to some embodiments. In some implementations, one or more battery backup units supply a set amount of voltage and current to a rack system, for example during an interruption to the main AC power and before the backup generator power system comes online 402 to provide voltage and current to the rack system. While the backup generator power system may take over all AC power for an entire data center during a power outage, an initial inrush current 404 from the backup generator power system may result in the backup generator power system failing, as well as damage to components of rack systems in the data center.

For example, a battery backup unit provides the voltage necessary to operate a rack system to which it is coupled in the event of a main AC power interruption, for example to the rack system individually or to the data center in which the rack system is located. Because the battery backup unit has limited power storage capacity, at some point a replacement source of power is required if the rack system is to continue operating. A backup generator power system is able to provide the voltage required by rack systems located in a data center; however, as described herein, an inrush current 404 caused by, for example, a need for the power supply units to recharge capacitors, may ultimately result in failure of the backup generator power system.

After the backup generator power system comes online, it delivers AC power to the one or more power supply units of individual rack systems comprising a data center, which then delivers DC power to the rack systems.

Figure 5:
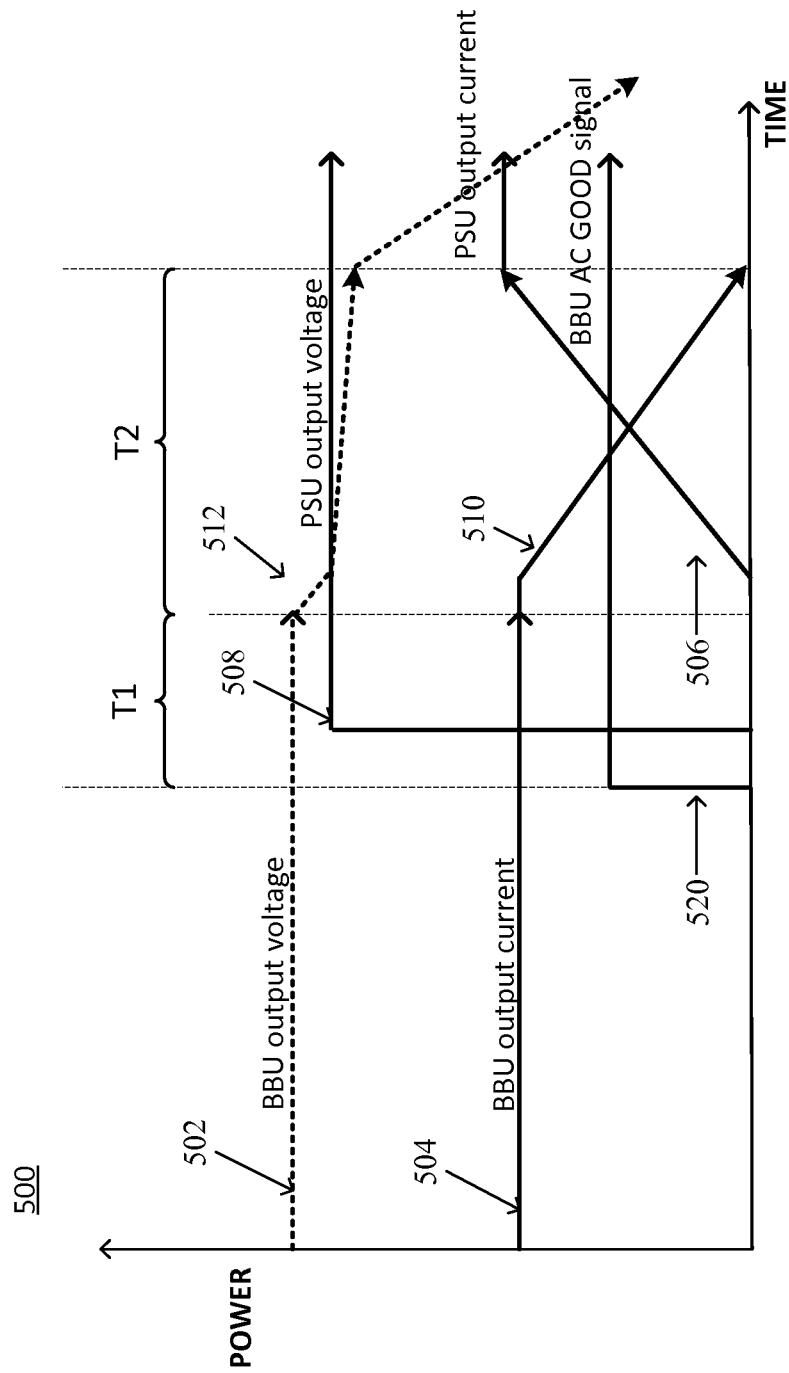
FIG. 5 illustrates a soft switching approach with a power supply unit and a battery backup unit, according to some embodiments.

FIG. 5 illustrates a soft switching approach 500 with a power supply unit and a battery backup unit, according to some embodiments. As shown in FIG. 5, at the start of the time period represented by the horizontal axis, a rack system (not shown) is receiving DC power from one or more battery backup units. In the example of FIG. 5, the battery backup unit is outputting a voltage 502 and a current 504. For example, the battery backup unit may be outputting 12.55 volts, for example to the bus bars of the rack system.

At the beginning of time period T1, a backup generator power system has initiated operation, resulting in an inrush current 506, followed by a current and voltage 508 being provided from the power supply unit.

In some implementations, during this initial time period (e.g., T1 in FIG. 5), the battery backup unit prevents the power supply unit from outputting power to the rack system, thereby allowing the battery backup unit, or other components, to verify that the inrush current has not caused any systems to malfunction. For example, during T1, the only power being delivered to the rack system is from the battery backup unit, even though power is flowing to and from the power supply unit. In some implementations, the battery backup unit manages the power distribution, although other implementations wherein other or several components operate to perform this action.

By preventing the rack system from immediately switching over to the power being provided by the power supply unit (originating from the now-online backup generator power system), it may be determined that the backup generator power system is providing a stable and reliable source of power; for example, that the inrush current has not caused damage to the power supply unit or caused the backup generator power system to fail. Additionally, by waiting for an initial time period (e.g., T1), the backup generator power system may achieve stable operation, thereby reducing the potential for failure of the rack system because of intermittent initial operation of the backup generator power system.

In some implementations, while the power being output from the power supply unit in T1 is not allowed to flow to the power supply unit (e.g., by control of the battery backup unit), the power is flowing from the power supply unit, but restricted (e.g., by electrical components such as a Schottky diode) from reaching the power supply unit. By way of analogy, a hose may be connected to an open faucet, but the water will not flow if the hose is stopped at its open end. Once the open end is released, the water flows.

This restricted flow of power from the power supply unit during initial time period T1 may, for example, output 12.5 volts, less than the battery backup unit is actively providing to the rack system. In some implementations, the exact voltage output by one or both of the battery backup unit and power supply unit will vary; however, in the example embodiment of FIG. 5, the potential power supply unit voltage output is less than that of the battery backup unit during the first time period T1. In some implementations, as long as the battery backup unit output voltage is greater than that of the power supply unit, the rack system will not source power from the power supply unit. For example, during T1, the output voltage of the battery backup unit is 12.55 volts and the output voltage of the power supply unit is 12.5 volts. By using electrical components and techniques known in the art, such as a Schottky diode, the higher output voltage from the battery backup unit prevents the lower output voltage from the power supply unit from flowing to the rack system.

In some implementations, aspects of the battery backup unit are responsible for controlling power output to the rack system. For example, once the backup generator power system initiates operation, power begins flowing to the power supply unit, which results in the power supply unit turning on. After time period T1 passes, the power supply unit communicates with the battery backup unit, resulting in the battery backup unit reducing its current, as described further herein.

In some implementations, once the predetermined initial time period T1 ends, the battery backup unit begins reducing its current gradually, allowing the power supply unit to take over. For example, as second time period T2 proceeds, a "soft-switching" transition is made between power being delivered to the rack system from the battery backup unit, to power being delivered to the rack system from the power supply unit (which is receiving power from the backup generator power system). As the current from the battery backup unit lessens 510, the output voltage from the battery backup unit similarly decreases 512. In an embodiment, once the battery backup unit output voltage is lower than the output voltage of the power supply unit 508 (e.g., less than 12.5 volts), then current from the power supply unit is allowed to flow to the rack server system. By tapering off the output voltage of the battery backup unit, an inrush current is prevented from reaching the rack server system. At the end of time period T2, the power supply unit is providing power to the rack system and the battery backup unit is relegated to providing a redundant source of power. For example, during time period T2, sufficient voltage to operate the rack system is provided by a sharing of current between the battery backup unit and the power supply unit. At the end of time period T2, the power supply unit is providing all power necessary to operate the rack system. By waiting to source power from the power supply unit during initial time period T1, and gradually transitioning between power exclusively from the battery backup unit to power exclusively from the power supply unit during time period T2, negative effects from inrush current and/or intermittent backup generator power system operation may be mitigated.

In some implementations, the rate of reduction in current from the battery backup unit during time period T2 may be represented in accordance with a line slope 510, or ratio over time. In some implementations, this slope is user-defined, or may be dynamically determined based on conditions related to aspects of the battery backup unit, the power supply unit, the rack system, the backup generator power system, the data center, or other component or combination of components. In some implementations, the slope of reduction in current from the battery backup unit may be non-linear, or may be variable depending on conditions detected by the battery backup unit, the power supply unit, the RMC, etc.

In some implementations, the reduction of current from the battery backup unit results in a reduction of output voltage from the battery backup unit. For example, the battery backup unit, which was initially outputting 12.55 volts, begins outputting less voltage as the amount of current output by the battery backup unit decreases. In some implementations, once the voltage output by the battery backup unit falls below that output by the power supply unit, the power supply unit output current is directed to the rack system, as described herein. A BBU AC GOOD signal 520 may be provided in an embodiment.

In some implementations, the time represented by T1 and T2 may vary according to various factors. For example, T1 and T2 may be user-determined, such as by an administrator. In some implementations, T1 and T2 may be dynamically determined according to conditions detected at the rack server system. For example, a component such as the battery backup unit may detect that the backup generator power system is behaving erratically; for example, turning on and off numerous times during T1. As a result, the battery backup unit may dynamically extend time period T1, such that power is not sourced from the power supply unit. Likewise, time period T1 could be dynamically shortened if it is determined that the power from the backup generator power system is stable, or that there was no inrush current, etc.

Figure 6:
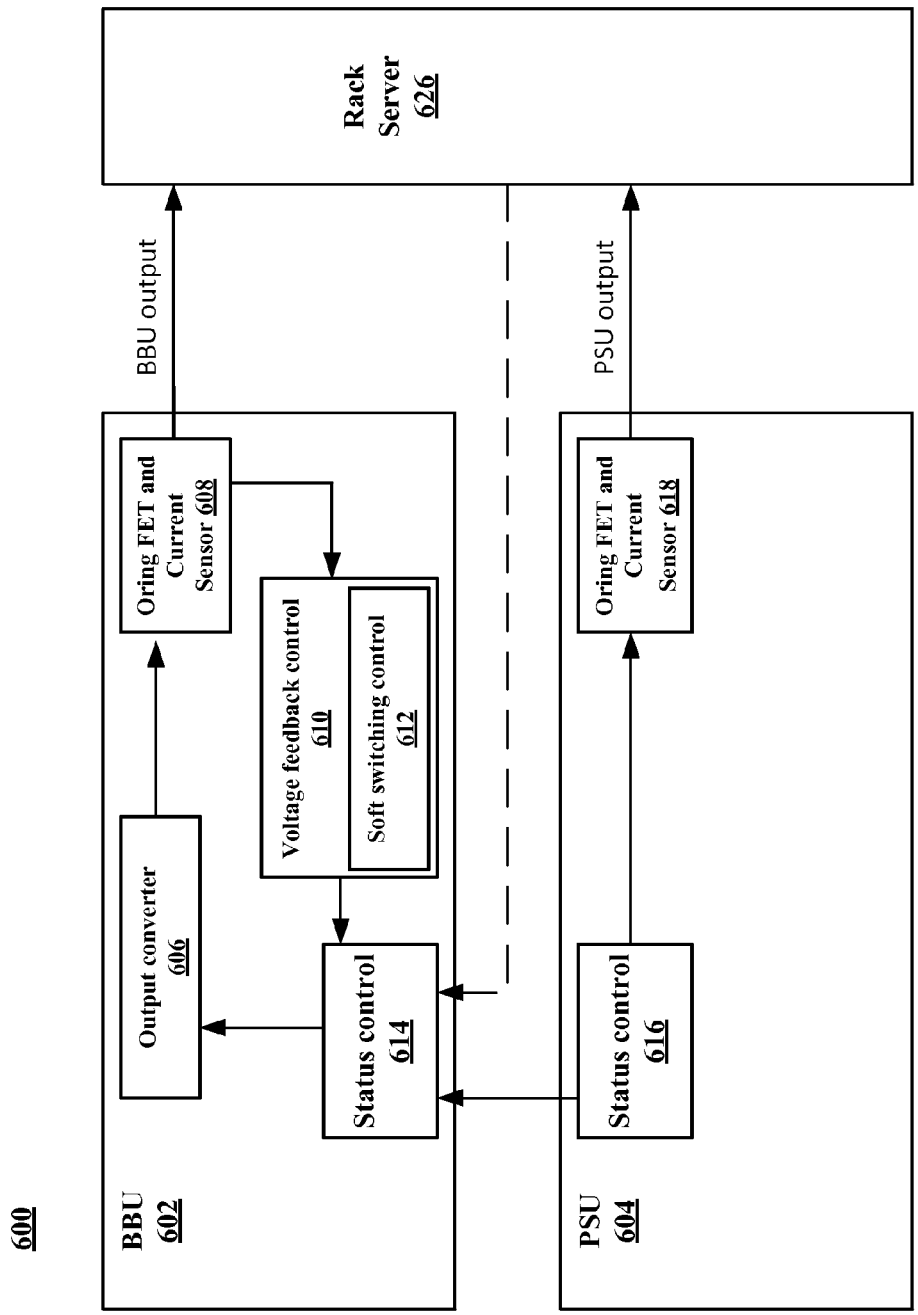
FIG. 6 is a block diagram illustrating an example of a soft-switching control system, according to some embodiments.

FIG. 6 is a block diagram illustrating an example of a soft-switching control system 600, according to some embodiments. In some implementations, a battery backup unit 602 and a power supply unit 604 are coupled to a rack system 626. For example, there may be one or more battery backup units 602 and power supply units 604 configured in a rack system 626, and there may be multiple rack systems 626 in a data center.

In some implementations, the battery backup unit 602 and power supply unit 604 provide power to rack system 626 according to an Oring FET and current sensor 608, 618. For example, current sensor 608 of battery backup unit 602 may cause battery backup unit 602 to output 12.55 volts and Oring FET and current sensor 618 of power supply unit 604 may cause power supply unit 604 to output 12.5 volts, although other voltage amounts are envisioned. Output converter 606 may operate as a DC/DC converter that transforms the battery backup unit power (e.g., 54 volts) to output DC (e.g., 12.55 volts) to rack system 626. Current sensor 608 may operate to control and detect the amount of power flowing from battery backup unit 602, and provide this information to a voltage feedback control 610 of battery backup unit 602. In some implementations, voltage feedback control 610 operates to determine the amount of voltage to be output from battery backup unit 602 in concert with a soft switching control 612. For example, soft switching control 612 may determine the rate (e.g., slope or curve) at which current from battery backup unit 602 is reduced during the soft-switching phase described above with regard to FIG. 5. For example, soft switching control 612 may determine the slope of the reduction in current from battery backup unit 602 and voltage feedback control 610 may communicate this control signal to a status control module 614 of battery backup unit 602.

In some implementations, soft switching control 612 provides a linear signal to voltage feedback control 610 of battery backup unit 602, and voltage feedback control 610 communicates a command received by Oring FET and current sensor 608 of battery backup unit 602 to reduce current and/or voltage dependent upon the linear signal curve. In some implementations, the slope of the signal curve may be non-linear. For example, the slope may be a curve, or may accelerate or diminish in a non-linear relationship. In an example, the battery backup unit slowly reduces its output current in order to reduce its output voltage.

In some implementations, current sensor 608 of battery backup unit 602 accomplishes the reduction in power by turning off (e.g., deactivating or preventing current from flowing) one or more battery backup units 602 of the rack system. For example, a set of 4 battery backup units 602 may be turned off in sequences or sequential groupings (e.g., one by one or two by two) to achieve a reduction in power output to the rack system. All battery backup units 602 may be shut off concurrently, for example to achieve immediate power cutoff. In some implementations, battery backup units 602 may be turned off randomly or in a predetermined sequence. For example, battery backup units 602 may be turned off in order corresponding to their charge level. For example, battery backup units 602 with a lowest amount of charge may be turned off at the beginning of a turnoff sequence. This would allow those battery backup units 602 to receive recharging sooner than the more-charged battery backup units 602. Additionally, the battery backup units 602 remaining with greater charge would be available to expend charge over a greater amount of time in the event of a power interruption during the soft switching period.

In some implementations, the rate of the soft switching period (i.e., the slope of the signal curve) may be dynamically optimized according to various criteria, for example historical data or current operational status of a backup generator power system. For example, data may be maintained that is used (e.g., by soft switching control 612) to calculate the slope of the reduction in power from battery backup units 602. There may be multiple backup generators, each of which may operate differently, or they may operate differently during different peak periods, etc. For example, the slope may be increased (i.e., power from battery backup units 602 turned down more quickly) if it is determined that a particular backup generator that operates at greater efficiency or reliability is online, or the slope may be decreased (i.e., power from battery backup units 602 turned down more slowly) if it is determined that the backup generator power system has been operating erratically or is communicating an error code, etc.

In some implementations, status control 614 of battery backup unit 602 and status control 616 of power supply unit 604 may communicate back and forth. For example, power supply unit 604 may notify battery backup unit 602 that the backup generator power system is online, and as a result, battery backup unit 602 should begin its soft switching operation mode.

In some implementations, rack system 626 may communicate with status control 614 of battery backup unit 602. For example, rack system 626 may notify battery backup unit 602 that power supply unit 604 is operating normally (e.g., inrush current has not damaged any components or resulted in a failure of the backup generator power system). Additionally, a RMC of rack system 626 may send a signal to status control 614 of battery backup unit 602, for example an I2C command or other communication known in the art.

In an embodiment, output current may be controlled by a control IC or other circuit. The IC has a detect pin VIN and VOUT. In an example, VIN>VOUT=CURRENT ON and VIN<VOUT=CURRENT OFF, for example to prevent reverse current from reaching the power bus.

In another embodiment, a constant voltage and constant current (CVCC) control circuit may be incorporated, along with a CC level controller which may generate a linear signal to the CVCC. An example control sequence may be that the BBU outputs in CV mode while operating as a backup. Upon receiving a BBS AC GOOD L→H signal, the CC level controller changes a mode from CV to CVCC. As a result, the CC level is slowly decreased from an example of 1200 A to 0 A by the CC level controller.

Figure 7:
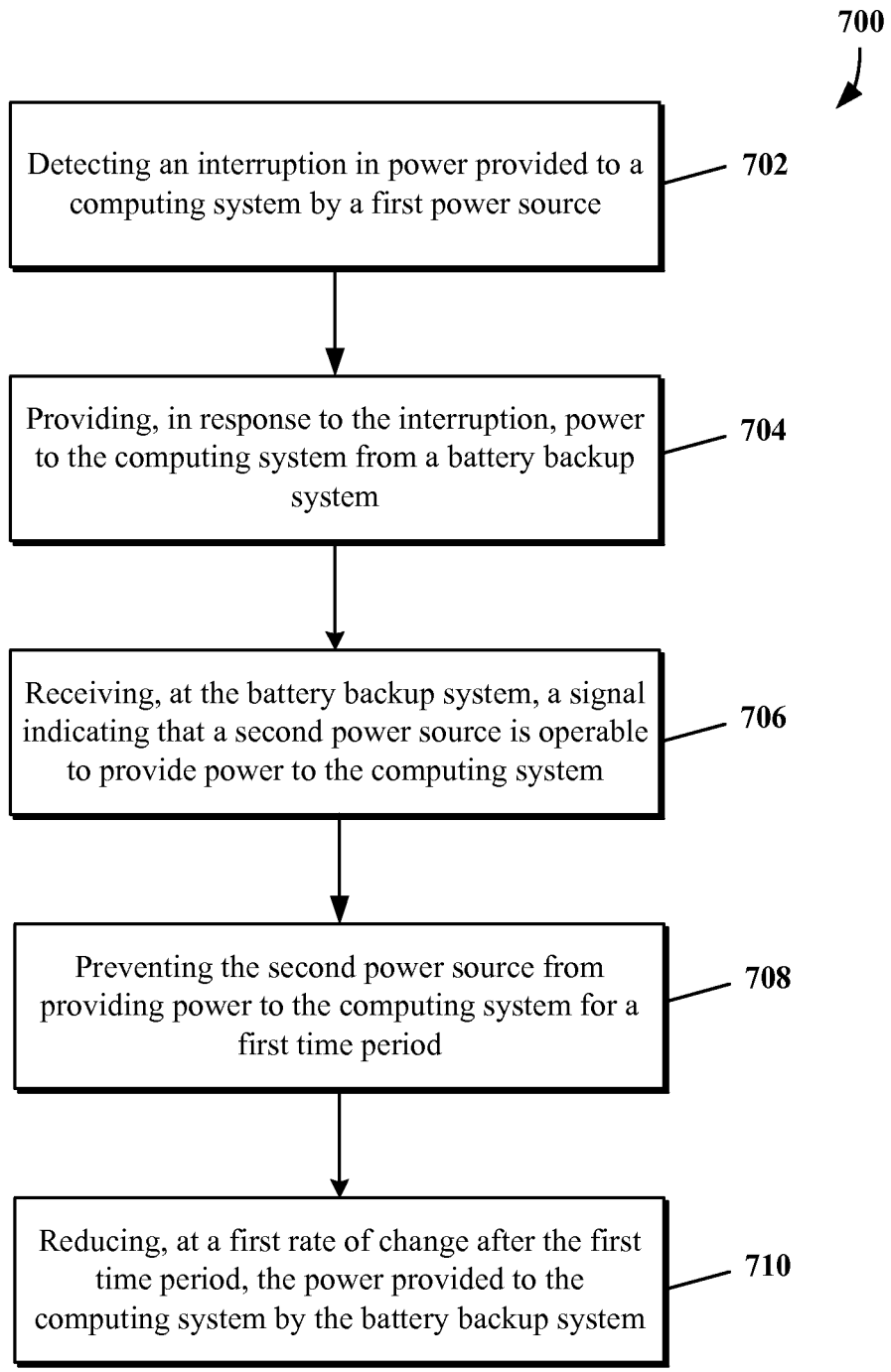
FIG. 7 is an example flow diagram for a soft switching control system, according to some embodiments.

FIG. 7 is an example flow diagram for a soft switching control system, according to some embodiments. For example, FIG. 7 can be performed by a microcontroller communicatively coupled to a battery backup unit, a power supply unit, a rack server system, or a rack management controller, among other modules, as described above. At step 702, an interruption in power provided to a computing system (e.g., a rack system) by a first power source can be detected. For example, components of a power supply unit and/or a battery backup unit can detect that the main AC power (e.g., from the power grid) has been disrupted.

At step 704, in response to detecting that the main AC power has been interrupted, power is provided to the rack system from a battery backup unit. For example, the battery backup unit (or units) are providing redundant power to the rack system, and upon a power supply unit (or units) detecting that power is no longer flowing into it, internal switches within the electrical system of the rack system route the redundant power from the battery backup unit to the rack system in lieu of power from the main AC through the power supply unit.

At step 706, it is determined that a second power source (e.g., a backup generator power system) is available to provide power to the rack system. For example, once the main AC power is interrupted, a backup power generator begins operating. Usually, there is latency between the backup power generator starting up and being able to deliver power. During this downtime, the battery backup unit powers the rack system.

At step 708, for a prescribed period of time, the power from the backup power generator is prevented from flowing to the rack system, for example through the power supply unit. For example, an initial surge of current (inrush current) may accompany the initial flow of power from the backup power generator, and as described above, may cause damage to components of the rack server or even cause the backup power generator to fail. In some implementations, power is prevented from reaching the rack system through the power supply unit by maintaining a higher voltage output from the battery backup unit that the power supply unit.

At step 710, the power provided to the rack system by the battery backup unit is reduced after the end of the prescribed time period. For example, the power from the battery backup unit is decreased by a rate that may be represented by a linear line slope (i.e., 1.0), such as a linear relationship of a particular unit of power over a particular unit of time. In the case of a linear relationship, for example, the power from the battery backup unit is reduced at an even rate over a period of time. In some implementations, the rate of reduction in power is a non-linear relationship, such as may be represented by a line slope of 0.5 or 2.0, or even a curved slope that represents an accelerating or decelerating rate of change. For example, the rate of reduction in power may be dynamically determined, such as being based on data related to the efficacy of the backup power generator, or present or past conditions of the rack system, the power supply unit, the battery backup unit, the backup power generator, or any other component, condition, or combination of components and/or conditions.

In some implementations, there are multiple battery backup units, and power from them may be reduced by deactivating, or turning off, one or more of the battery backup units at a time. For example, the battery backup units may be turned off one at a time (or a subset of the battery backup units at a time) until all of them are turned off. The order may be random, sequential, or based on various criteria such as charge status, administrator configuration, real-time monitoring data, etc.

In some implementations, during the time that the battery backup unit is reducing power, power from the backup power generator is flowing to the rack system from the power supply unit. For example, after the initial time period wherein power from the backup power generator is suppressed while it is determined that an inrush current has not caused the backup power generator to fail, then power from the backup power generator is allowed to flow to the power supply unit, and from there to the rack system. Current to the rack system may be shared from current emanating from the power supply unit and the battery backup unit, until the battery backup unit is not longer providing primary power to the rack system (i.e., the battery backup unit has been relegated to providing redundant power).

Example System Architecture

Figure 8:
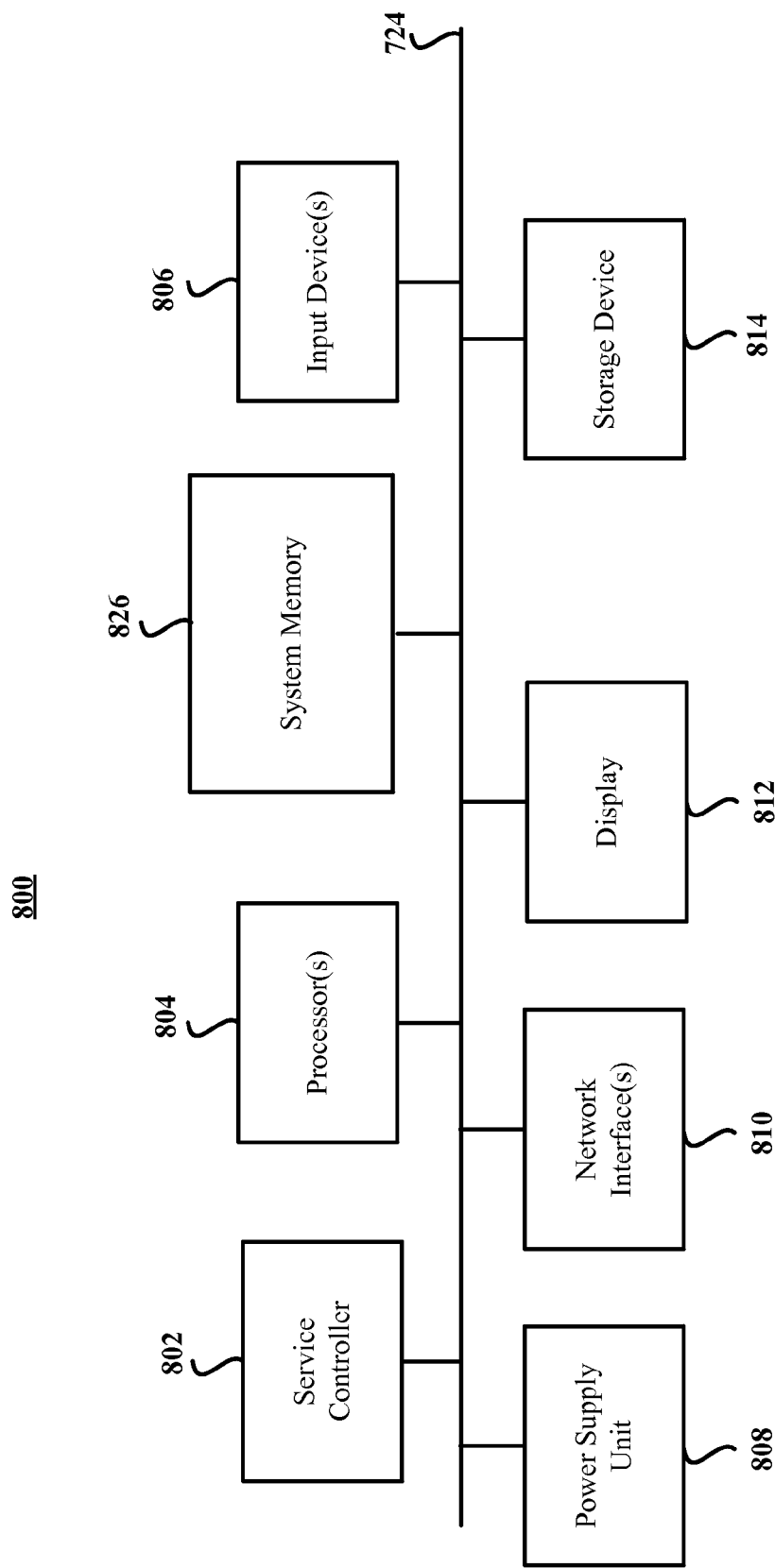
FIG. 8 is a block diagram of an example system architecture implementing the features and processes of FIGS. 1-7.

FIG. 8 is a block diagram of an example system architecture 800 implementing the features and processes of FIGS. 1-7. The architecture 800 can be implemented on any electronic device that runs software applications derived from compiled instructions, including without limitation personal computers, servers, smart phones, media players, electronic tablets, game consoles, email devices, etc. In some implementations, the architecture 800 can include one or more processors 804, one or more input devices 806, one or more display devices 812, one or more network interfaces 810, one or more service controllers 802, one or more power supply units 808, one or more system memory modules 826, and one or more computer-readable storage mediums 814. Each of these components can be coupled by bus 804.

Display device 812 can be any known display technology, including but not limited to display devices using Liquid Crystal Display (LCD) or Light Emitting Diode (LED) technology. Processor(s) 804 can use any known processor technology, including but are not limited to graphics processors and multi-core processors. Input device 806 can be any known input device technology, including but not limited to a keyboard (including a virtual keyboard), mouse, track ball, and touch-sensitive pad or display. Input device 806 can include a power button for turning on and supplying power to processor(s) 804, display 812, network interfaces 810, and/or input devices 806. Bus 804 can be any known internal or external bus technology, including but not limited to ISA, EISA, PCI, PCI Express, NuBus, USB, Serial ATA or FireWire.

Computer-readable storage medium 814 can be any medium that participates in providing instructions to processor(s) 804 for execution, including without limitation, non-volatile storage media (e.g., optical disks, magnetic disks, flash drives, etc.) or volatile media (e.g., SDRAM, ROM, etc.). Computer-readable storage medium 814 can provide instructions to service controller 802, for example. Alternatively, the instructions for soft switching after power interruption can be embedded in system controller 802, which in various implementations may comprise microprocessors or modules embedded or communicatively connected to power supply units, battery backup units, etc., as described herein. The computer-readable storage medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Service controller 802 can be a service controller that operates independently of processor(s) 804. For example, service controller 802 can be a baseboard management controller (BMC) that monitors device sensors (e.g., voltages, temperature, fans, etc.), logs events for failure analysis, provides LED guided diagnostics, performs power management, and/or provides remote management capabilities through an intelligent platform management interface (IMPI), keyboard, video, and mouse (KVM) redirection, serial over LAN (SOL), and/or other interfaces. Service controller 802 can be a rack management controller (RMC) or other component related to soft switching as described herein.

In the example shown, system memory 826 can include various modules that include executable instructions to implement functionalities described herein. In the example shown, system memory 826 includes a log manager, a log buffer, or a log repository—each can be configured to provide one or more functions described herein.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   detecting an interruption in a first power provided to a computing system by a first power source;
   in response to the interruption,
      providing a second power to the computing system from a battery backup system,
      activating a second power source, and
      preventing the second power source from providing a third power to the computing system during a first time period after the second power source is activated;
   monitoring, by a status control circuit of the battery backup system during the first time period, whether the second power source is operable to provide the third power to the computing system;
   configuring the second power source to provide the third power to the computing device; and
   reducing, at a first rate of change during a second time period after the first time period, the second power provided to the computing system by the battery backup system,
   wherein the battery backup system and the second power source are concurrently providing the second power and the third power, respectively, to the computing system during the second time period, and
   wherein a rate of the first rate of change is determined, by the battery backup system, based upon a current operational status of the second power source and a past condition of the battery backup system.

2. The method of claim 1, further comprising:
   providing, after the first time period, the third power to the computing system by the second power source.

3. The method of claim 1, wherein the first rate of change comprises a linear slope.

4. The method of claim 1, wherein the first rate of change comprises a non-linear slope.

5. The method of claim 1, wherein the battery backup system comprises a plurality of battery backup units, and wherein reducing the second power provided to the computing system by the battery backup system comprises disconnecting the battery backup units in a sequential order.

6. The method of claim 1, wherein the battery backup system comprises a plurality of battery backup units, and wherein reducing the second power provided to the computing system by the battery backup system comprises disconnecting one or more of the battery backup units in a random order until all of the battery backup units are disconnected.

7. The method of claim 1, wherein the battery backup system comprises a plurality of battery backup units, and wherein reducing the second power provided to the computing system by the battery backup system comprises disconnecting the battery backup units according to an amount of charge associated with each of the battery backup units.

8. The method of claim 1, wherein the first time period is determined based on data associated with the second power source.

9. The method of claim 1, wherein the first rate of change is calculated prior to reducing the second power provided to the computing system by the battery backup system, and wherein the calculation is based on data associated with the second power source.

10. The method of claim 1, wherein the first rate of change during the second time period after the first time period is further determined based upon historical data or current operational status of the battery backup system.

11. A non-transitory computer-readable medium including one or more sequences of instructions which, when executed by a system controller, causes:
  detecting an interruption in a first AC power provided to a rack server system by a first power source;
  in response to the interruption,
    providing DC power to the rack server system by a battery backup system comprising a plurality of battery backup units,
    activating a second power source, and
    preventing the second power source from providing a second AC power to the rack server system after the second power source is activated;
  monitoring, during a first time period, a signal indicating that the second power source is operable to provide power to the rack server system;
  when the signal meets a criteria during the first time period, reducing at a first rate of change, during a second time period, the power provided to the rack server system from the plurality of battery backup units,
  wherein the second time period follows the first time period;
  wherein at least one of the plurality of battery backup units and the second power source are concurrently providing the DC power and the second AC power, respectively, to the rack server system during the second time period; and
  wherein the first rate of change is determined, by the battery backup system, based on a current operational status of the second power source and a past condition of the battery backup system.

12. The non-transitory computer-readable medium of claim 11, wherein the first rate of change comprises a linear slope.

13. The non-transitory computer-readable medium of claim 11, wherein reducing the power provided to the rack server system by the plurality of battery backup units comprises disconnecting the battery backup units in a sequential order.

14. The non-transitory computer-readable medium of claim 11, wherein reducing the power provided to the rack server system by the plurality of battery backup units comprises disconnecting the battery backup units in a random order.

15. A system comprising:
  at least one power supply unit;
  at least one battery backup unit;
  one or more processors;
  a system controller; and
  a computer-readable medium including one or more sequences of instructions which, when executed by the system controller, causes:
    detecting an interruption in a first power provided to the at least one power supply unit by a first power source;
  in response to the interruption,
    providing a second power to the system from the at least one battery backup unit for a first time period,
    activating a second power source, and
    preventing the second power source from providing a third power to the system through the at least one power supply unit for the first time period after the second power source is activated;
    monitoring, by a status control circuit of the at least one battery backup unit during the first time period, whether the second power source is operable to provide power to the system; and
    reducing, at a first rate of change during a second time period after the first time period, the second power provided to the system by the at least one battery backup unit, wherein a rate of the first rate of change is dynamically optimized, by the at least one battery backup unit, based at least upon historical data of the second power source; and
    allowing the second power source to provide the third power to the system through the at least one power supply unit during the second time period.

16. The system of claim 15, wherein at the end of the second time period, no second power is being provided to the system from the at least one battery backup unit.

17. The system of claim 15, wherein the system controller is communicatively coupled to the at least one power supply unit and the at least one battery backup unit.

18. The system of claim 15, wherein the system controller is a rack management controller.

19. The system of claim 15, wherein the at least one battery backup unit comprises a plurality of battery backup units, and wherein reducing the second power provided to the system by the at least one battery backup unit comprises disconnecting the plurality of battery backup units in a sequential order.

20. The system of claim 15, wherein the at least one battery backup unit comprises a plurality of battery backup units, and wherein reducing the second power provided to the system by the at least one battery backup unit comprises disconnecting one or more of the battery backup units in a sequential order until all of the battery backup units are disconnected.

* * * * *